US008719870B1

(12) United States Patent
Davies et al.

(10) Patent No.: US 8,719,870 B1
(45) Date of Patent: May 6, 2014

(54) SYSTEM FOR INTERACTING WITH AN ELECTRONIC PROGRAM GUIDE (71) Applicants: Marc Davies, London (GB); Simon Miller, London (GB)

(72) Inventors: Marc Davies, London (GB); Simon Miller, London (GB)

(73) Assignee: Zeebox Limited (GB)

( * ) Notice: Subject to any disclaimer, the term of this patent is extended or adjusted under 35 U.S.C. 154(b) by 0 days.

(21) Appl. No.: 13/774,773

(22) Filed: Feb. 22, 2013

(51) Int. Cl.
H04N 5/445 (2011.01)
G06F 3/00 (2006.01)
G06F 13/00 (2006.01)

(52) U.S. Cl.
USPC ............... 725/52; 725/39; 725/44; 725/56; 725/61

(58) Field of Classification Search
None
See application file for complete search history.

(56) References Cited

U.S. PATENT DOCUMENTS

| | | | |
|---|---|---|---|
| 7,478,414 B1 | 1/2009 | Glusker et al. | |
| 7,941,819 B2* | 5/2011 | Stark et al. | 725/45 |
| 2001/0013126 A1* | 8/2001 | Lemmons et al. | 725/53 |
| 2002/0112239 A1 | 8/2002 | Goldman | |
| 2004/0231003 A1 | 11/2004 | Cooper et al. | |
| 2006/0143657 A1* | 6/2006 | Song | 725/52 |
| 2007/0022436 A1* | 1/2007 | Song | 725/38 |
| 2008/0208839 A1 | 8/2008 | Sheshagiri et al. | |
| 2009/0228921 A1 | 9/2009 | Miki et al. | |
| 2010/0031290 A1 | 2/2010 | Hua et al. | |
| 2010/0267370 A1* | 10/2010 | Lee | 455/414.1 |
| 2010/0306805 A1 | 12/2010 | Neumeier et al. | |
| 2010/0319015 A1 | 12/2010 | Remington | |
| 2011/0035771 A1* | 2/2011 | Ward et al. | 725/34 |
| 2011/0247039 A1* | 10/2011 | Cheng et al. | 725/52 |
| 2012/0060188 A1* | 3/2012 | Stallings et al. | 725/44 |
| 2012/0174156 A1* | 7/2012 | Park et al. | 725/40 |

FOREIGN PATENT DOCUMENTS

| | | |
|---|---|---|
| EP | 1318672 A1 | 6/2003 |
| EP | 2251995 A1 | 11/2010 |
| EP | 2276240 A2 | 1/2011 |
| KR | 2011071450 A | 6/2011 |
| WO | 2008101557 A1 | 8/2008 |
| WO | 2010112072 A1 | 10/2010 |
| WO | 2011093649 A2 | 8/2011 |

* cited by examiner

Primary Examiner — Mark D Featherstone
Assistant Examiner — Akshay Doshi
(74) Attorney, Agent, or Firm — St. Onge Steward Johnston & Reens LLC (57) ABSTRACT A computer system includes a touch-screen display that displays an electronic program guide to a user. The EPG includes a list of television programs scheduled to be shown at a current time as well as a timeline and an indicator. The television programs in the EPG have a substantially fixed size, independent of the program duration. The user can adjust the relevant time in the EPG by manipulating the timeline and the indicator so that they slide relative to one another. The EPG is updated to include a list of television programs at a new time according to the new position of the indicator on the timeline. A selectable icon is provided to enable the user to return the EPG to a current time.

16 Claims, 5 Drawing Sheets

SYSTEM FOR INTERACTING WITH AN ELECTRONIC PROGRAM GUIDE

FIELD OF THE INVENTION

This invention relates to a computer system and a corresponding method for interacting with an Electronic Program Guide (EPG).

BACKGROUND OF THE INVENTION

EPGs are commonly used in digital television so that a user can review scheduled television programs. Typically an EPG can be displayed on a television screen, a computer screen or a remote control. An EPG generally includes a list of scheduled television programs over a period of time. The list of television programs in the EPG is typically ranked by the ordinal number of the channel or by genre.

The standard way to render an EPG today is the so-called "grid view" EPG. The grid view EPG consists of a number of rows, each row representing one television channel. The horizontal axis of the grid represents a timeline. In a grid view EPG each program is typically displayed with a width that is proportional to its on-air duration. For example, a programme that runs for 60 minutes may be displayed with a width of 100 pixels, and a programme that's 30 minutes long would thus be displayed with a width of 50 pixels. Thus, as one scrolls a grid-view EPG along the timeline all channels and programs scroll in unison. This approach provides a number of problems for short-duration programmes as they may appear so small in the EPG that programme image, title, description or other pertinent information may be obscured. In addition, parts of the previous and next shows are at most times partially cut off and partially off-screen. The grid-view EPG may also represent an information overload for the user who simply wants to see the list of shows that are on at a given time.

Typically an EPG also includes a functionality to allow a user to examine television programs scheduled at different times. For example, a user can review a list of television programs that are scheduled for the next day at 8 pm. This may be achieved by allowing the user to enter a time and date with a keyboard, or by advancing the EPG by a predetermined time period upon selection of a button on a remote control.

It has been found that conventional tools for changing the time in a displayed EPG can be somewhat inconvenient for users. For example, a user may not always have a keyboard with which to indicate a particular time and/or it may be undesirable to replace or obscure a displayed EPG with a pop-up keyboard. In addition, a simple scrolling button on a remote control offers little flexibility for a user if they want to advance the EPG to a specific point in time.

Another problem with conventional EPGs is that it can be difficult for a user to return the EPG to the current time, after they have been reviewing scheduled programs at another time. An object of the invention is to alleviate some of these problems.

SUMMARY OF THE INVENTION

According to an aspect of the present invention there is provided a computer system comprising: a display configured to display an electronic program guide (EPG) to a user, wherein the EPG comprises a list of television programs scheduled at a first time, a timeline, and an indicator for indicating the first time on the timeline; an input module configured to receive a user generated input, wherein the input involves selecting one of the indicator and the timeline on the display and adjusting their positions by moving one relative to the other; one or more processors configured to adjust the appearance of the EPG in response to the received input so that the timeline and the indicator move relative to one another until the indicator is at a new position relative to the timeline, wherein the new position corresponds to a second time, and wherein the one or more processors are configured to update the displayed EPG so that it comprises a list of television programs scheduled at the second time.

In this way, a user can easily update an EPG so that it shows a list of television programs at a past or future time. This can be achieved by moving or sliding the indicator on the timeline until it corresponds to the desired past or future time. The list of television programs can then be updated so that it shows programs that are scheduled for the selected past or future time. It has been found that this is a particularly convenient mechanism for users to manipulate the time for which scheduled programs displayed in an EPG, especially when using touch screen controls. The first time may correspond to the current time and the second time may correspond to a desired past or future time.

In certain embodiments the timeline and the indicator may be considered as components in an electronic slide rule. A user can slide the timeline relative to the indicator until it comes to rest at a position corresponding to a desired time and date.

Preferably the input module is configured to receive a user input by which the user can indicate that the indicator should revert from the second time to the first time on the timeline. Responsive to this input the one or more processors are preferably configured to update the displayed EPG so that it comprises the list of television programs scheduled at the first time.

Preferably the indicator and the timeline are configured to move relative to one another on the display until the indicator once more corresponds to the first time. The user therefore has a quick mechanism for returning to the first time, which may correspond to the current or real time.

Preferably the display is configured to display a selectable item with which the user can indicate that the indicator should revert to the first time on the timeline. In some embodiments the selectable item corresponds to a "Now" button on the EPG. Selection of the "Now" button will cause the one or more processors to update the displayed EPG so that it displays the list of television programs scheduled at the first or current time. The displayed "Now" button preferably appears only when the indicated time on the timeline is not equal to the current time.

The display, the input module and the one or more processors may be components in a client device, and the one or more processors may be configured to acquire the list of television programs scheduled at the second time from an external source. The external source may be a server computer with which the client device can communicate over a network. The list of television programs scheduled at the first time is also preferably acquired from the server computer initially, and then stored in a data storage unit.

The client device may comprise a data storage unit in which the list of television programs scheduled at the first time is stored. The one or more processors may be configured to retrieve the list of television programs scheduled at the first time from the data storage unit when updating the displayed EPG so that it is relevant to the first time. By storing these data in a local data storage unit they can be retrieved rapidly when the user hits a "Now" button to return the EPG to the current time. This can provide a much quicker update of the EPG than if the data had to be acquired from a server over a network.

The EPG may comprise a visible timestamp when the indicator is at the position corresponding to the second time on the timeline. The timestamp is preferably not shown when the indicator is at the current time because this information is likely to be superfluous.

The EPG may comprise a visible timestamp when the indicator is moving relative to the timeline so that the user can control the position of the indicator precisely. For example, this may allow the user to position the indicator on the timeline for 8 pm on Tuesday evening so that they can review the television programs scheduled for that time.

The visible timestamp may be larger when the indicator is moving relative to the timeline than when the indicator is at rest. By displaying a larger timestamp during the transitional, moving phase it can be easier for a user to see the effect of their manipulations. On the other hand, smaller text is acceptable when the indicator is at rest because dynamic feedback is not required.

The EPG may comprise a list of television programs scheduled at a first time, and a list of subsequently scheduled television programs. In one embodiment the user can examine the next television program to be shown on a particular channel without altering the position of the indicator relative to the timeline. This offers a speedy mechanism for examining the programming for a particular channel without changing the view of all channels at the same time. In certain embodiments the list may also include the preceding television program.

The displayed EPG may include a list with only a single television program for each channel, and the input module may be configured to receive a user generated input so that the user can toggle between the television program scheduled at the first time and the subsequently scheduled television program. Preferably the list of television programs at the first time is acquired from a server together with a list of preceding and subsequently scheduled television programs for each channel. This means that these data can be presented immediately when a user toggles between currently scheduled program and subsequent or preceding programs; the user does not need to wait for data to be acquired from a server upon receipt of the toggle command.

The user generated input may involve manipulating the EPG so that the list includes a television program which is scheduled at a third time. In one arrangement the EPG may be manipulated by selecting a single television channel in the EPG and scrolling to view preceding or subsequent television programs. The appearance of the EPG can then be adjusted so that the indicator is at a new position relative to the timeline, corresponding to the third time. The one or more processors can then update the EPG so that programs scheduled at the third time are displayed for all channels. This can provide a further mechanism for adjusting the time in an EPG. By sliding the indicator relative to the timeline it is possible to make large changes in the time of the EPG, corresponding to a number of hours. By scrolling television programs in an individual channel it may be easier to make fine-grain changes in time of the EPG, corresponding to a number of minutes.

The displayed EPG may include one or more of the name of the television program, a start time, an end time, and an identifier for at least one of the user's contacts. The size of the television program in the EPG is preferably fixed, and is independent of the television program's duration. This provides a simpler EPG for the user to understand. It also allows information to be displayed in full for short-duration programs.

The user generated input may involve selecting the timeline on the display and moving it relative to the indicator, which remains stationary on the display. This is advantageous because, when using a touch screen, the user can manipulate the timeline without covering the indicator with their finger. The indicator and associated information such as a timestamp are not therefore obscured by the user's finger.

In an alternative embodiment the indicator may be selected and moved relative to the timeline. This may be a convenient arrangement where the indicator can be selected by a mouse pointer that is less likely to obscure important details.

According to another aspect of the present invention there is provided a method of interacting with an electronic program guide (EPG) in a computer system comprising the steps of: displaying the EPG to a user, wherein the EPG comprises a list of television programs scheduled at a first time, a timeline, and an indicator for indicating the first time on the timeline; selecting one of the indicator and the timeline on the display and adjusting their positions by moving one relative to the other; adjusting the appearance of the EPG in response to the received input so that the timeline and the indicator move relative to one another until the indicator is at a new position relative to the timeline, wherein the new position corresponds to a second time; and updating the displayed EPG so that it comprises a list of television programs scheduled at the second time.

According to another aspect of the present invention there is provided a computer readable storage medium having a computer program stored thereon, the computer program comprising processor readable instructions that, when executed, direct a device to perform actions comprising: displaying an electronic program guide (EPG) to a user, wherein the EPG comprises a list of television programs scheduled at a first time, a timeline, and an indicator for indicating the first time on the timeline; receiving a user generated input, wherein the input involves selecting one of the indicator and the timeline on the display and adjusting their positions by moving one relative to the other; adjusting the appearance of the EPG in response to the received input so that the timeline and the indicator move relative to one another until the indicator is at a new position relative to the timeline, wherein the new position corresponds to a second time; and updating the displayed EPG so that it comprises a list of television programs scheduled at the second time.

According to another aspect of the invention there is provided a computer system comprising: a display configured to display an EPG to a user, wherein the EPG comprises a list of television programs scheduled at a first time, a timeline, and an indicator for indicating the first time on the timeline; an input module configured to receive a user generated input to change the first time; one or more processors configured to adjust the appearance of the EPG in response to the received input so that the indicator indicates a second time on the timeline, and wherein the one or more processors are configured to update the displayed EPG so that it comprises a list of television programs scheduled at the second time; wherein the display is configured to display a selectable item with which the user can indicate that the indicator should revert to the first time on the timeline, and wherein the input module is configured to detect selection of the selectable item and cause the one or more processors to update the displayed EPG so that it comprises a list of television programs scheduled at the first time.

In this way the user can interact with an EPG so that it can display a list of television programs scheduled to be shown at a desired past or future time. A selectable item is also provided so that the user has a shortcut to return the EPG to a current time.

According to another aspect of the invention there is provided a method of displaying an EPG to a user, wherein the EPG comprises a list of television programs scheduled at a first time, a timeline, and an indicator for indicating the first time on the timeline, the method comprising the steps of; receiving a user generated input to change the first time; adjusting the appearance of the EPG in response to the received input so that the indicator indicates a second time on the timeline; updating the displayed EPG so that it comprises a list of television programs scheduled at the second time; displaying a selectable item with which the user can indicate that the indicator should revert to the first time on the timeline; detecting selection of the selectable item; and updating the displayed EPG so that it comprises a list of television programs scheduled at the first time.

According to another aspect of the present invention there is provided a computer readable storage medium having a computer program stored thereon, the computer program comprising processor readable instructions that, when executed, direct a device to perform actions comprising: receiving a user generated input to change a first time in an EPG comprising a list of television programs scheduled at the first time, a timeline, and an indicator for indicating the first time on the timeline; adjusting the appearance of the EPG in response to the received input so that the indicator indicates a second time on the timeline; updating the displayed EPG so that it comprises a list of television programs scheduled at the second time; displaying a selectable item with which the user can indicate that the indicator should revert to the first time on the timeline; detecting selection of the selectable item; and updating the displayed EPG so that it comprises a list of television programs scheduled at the first time.

According to yet another aspect of the present invention there is provided a computer system comprising: a display configured to display an EPG to a user, wherein the EPG comprises a list of television programs scheduled at a first time; an input module configured to receive a user generated input, wherein the user generated input involves manipulating the EPG so that the list includes a television program which is scheduled at a second time; and one or more processors configured to update the displayed EPG so that it comprises a list of television programs scheduled at the second time.

In one embodiment the user may be able to manipulate the EPG so that a preceding or subsequent television program can be displayed for a particular channel. The entire EPG can then be updated according to the scheduled time of this program. This can offer a speedy mechanism for displaying an EPG at a new time.

Preferably the user generated input involves selecting a television channel in the EPG and scrolling to view preceding or subsequent television programs. The EPG can be updated dynamically so that the programs on other channels slot into place according to the scheduling at the second time.

Preferably the television programs in the EPG are displayed with a substantially fixed size, independent of program duration. It has been found that this is a more intuitive display for a user. The use of fixed size programs in the EPG means that a careful update should be performed when a user scrolls a selected channel to display a television program scheduled at a different time. Depending on the scheduling on other channels a complete update of the EPG may be required or zero update may be required.

In one example, the currently broadcast program on a channel may be a movie with a long duration. The user may scroll the relevant channel to view the following program. The scheduled start time for this program may be more than one hour in the future. Thus, a significant update of the EPG may be required since many of the programs on the other channels may be different at the scheduled start time. In an alternative example, the currently broadcast program on a channel may be a five-minute news item. In this example, a minor update of the EPG may be required if the user scrolls to view the following program since the programming may be unchanged for many of the channels if there is only a five minute difference.

According to yet another aspect of the present invention there is provided a method of manipulating an EPG comprising the steps of: displaying an EPG to a user, wherein the EPG comprises a list of television programs scheduled at a first time; receiving a user generated input, wherein the user generated input involves manipulating the EPG so that the list includes a television program which is scheduled at a second time; and updating the displayed EPG so that it comprises a list of television programs scheduled at the second time.

According to another aspect of the present invention there is provided a computer readable storage medium having a computer program stored thereon, the computer program comprising processor readable instructions that, when executed, direct a device to perform actions comprising: displaying an EPG to a user, wherein the EPG comprises a list of television programs scheduled at a first time; receiving a user generated input, wherein the user generated input involves manipulating the EPG so that the list includes a television program which is scheduled at a second time; and updating the displayed EPG so that it comprises a list of television programs scheduled at the second time.

Apparatus features may be provided as corresponding method features and vice-versa.

BRIEF DESCRIPTION OF THE DRAWINGS

Embodiments of the present invention will now be described, by way of example only, with reference to the accompanying drawings in which.

DETAILED DESCRIPTION OF THE INVENTION

Figure 1:
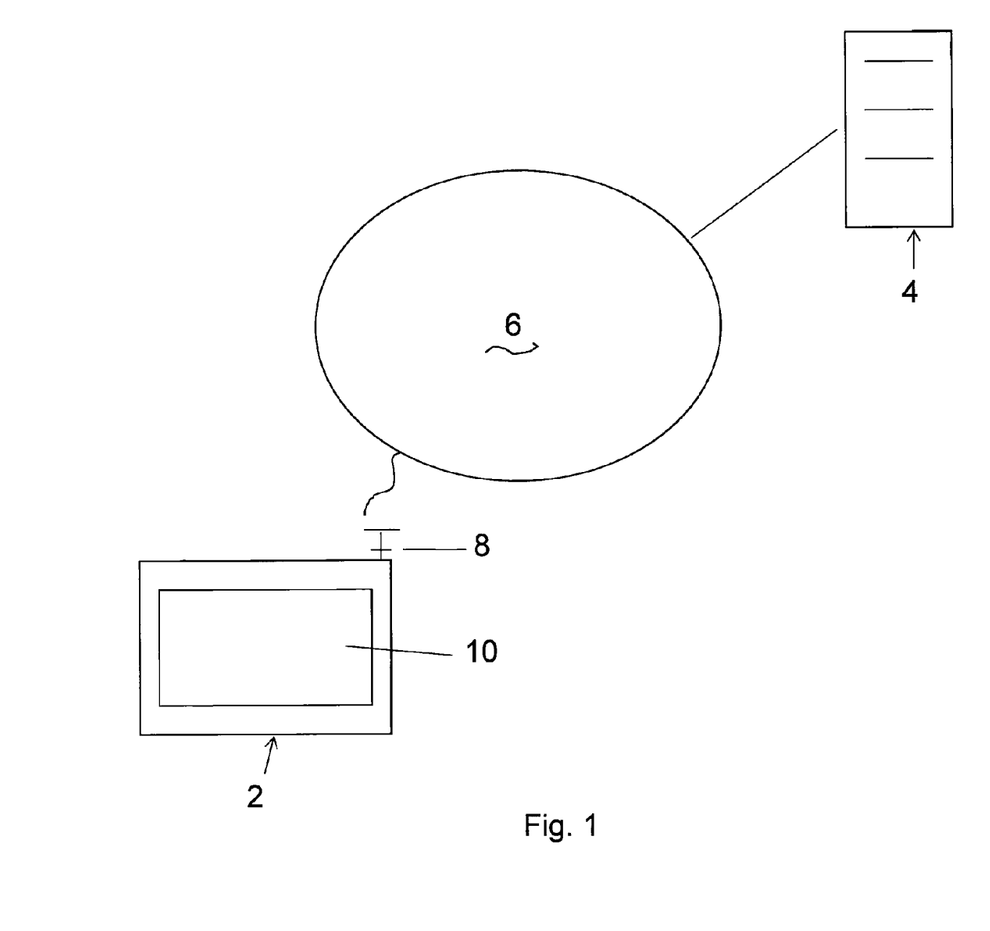
FIG. 1 is a schematic view of a client and server device in a network in an embodiment of the present invention.
Figure 2:
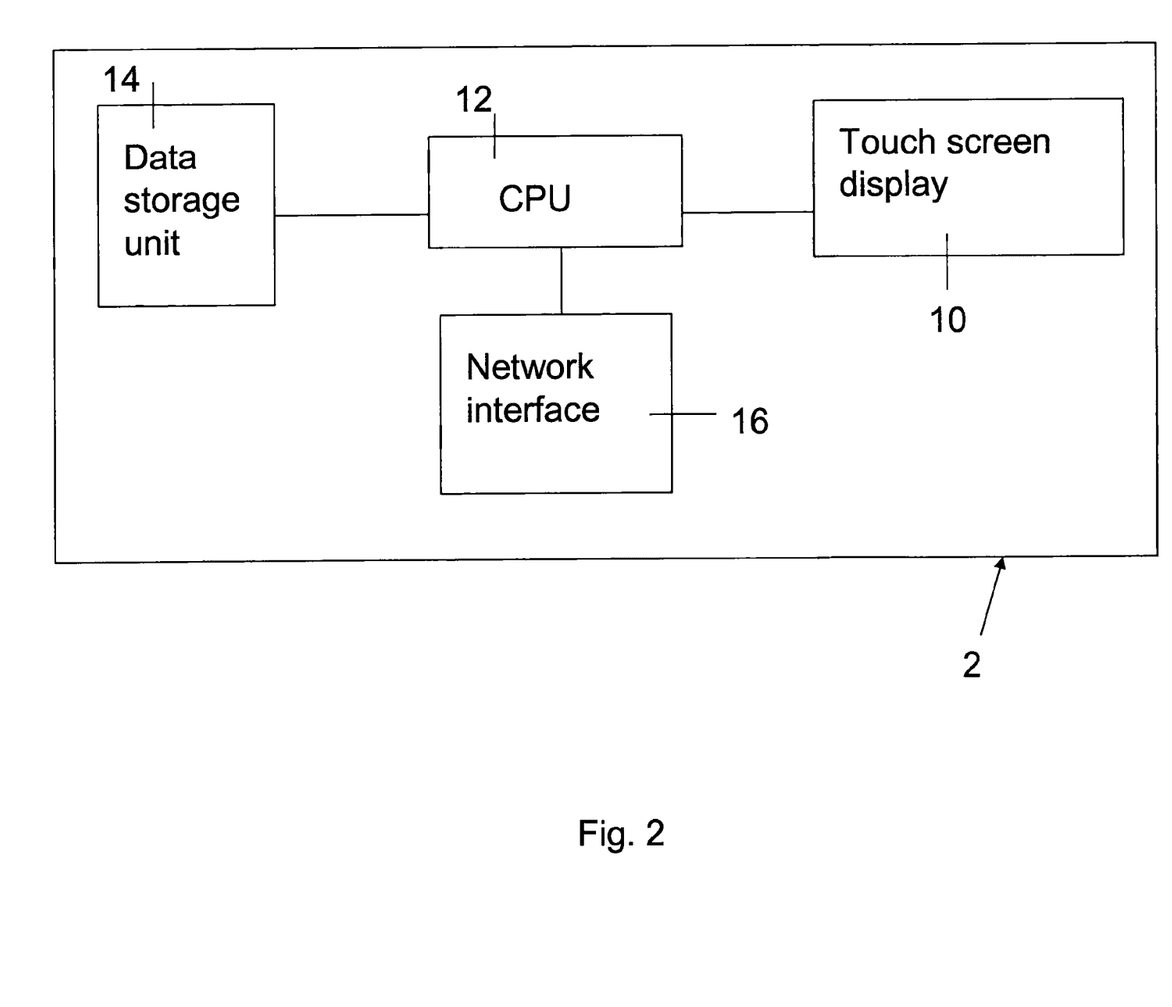
FIG. 2 is a schematic view of the components in a client device in an embodiment of the present invention.

FIG. 1 is a schematic view of a client device 2 and a server computer 4 in communication over a network 6 such as the internet. The client device 2 includes an aerial 8 or some other means for use in transmitting and receiving data over the network 6. The client device 2 also includes a passive or touch-screen 10 that can be used both for displaying an EPG to a user and, where applicable, for receiving user input. Further detail of the client device 2 is provided in FIG. 2. The client device 2 includes a central processing unit (CPU) 12, a data storage unit 14 and a network interface 16.

Figure 3:
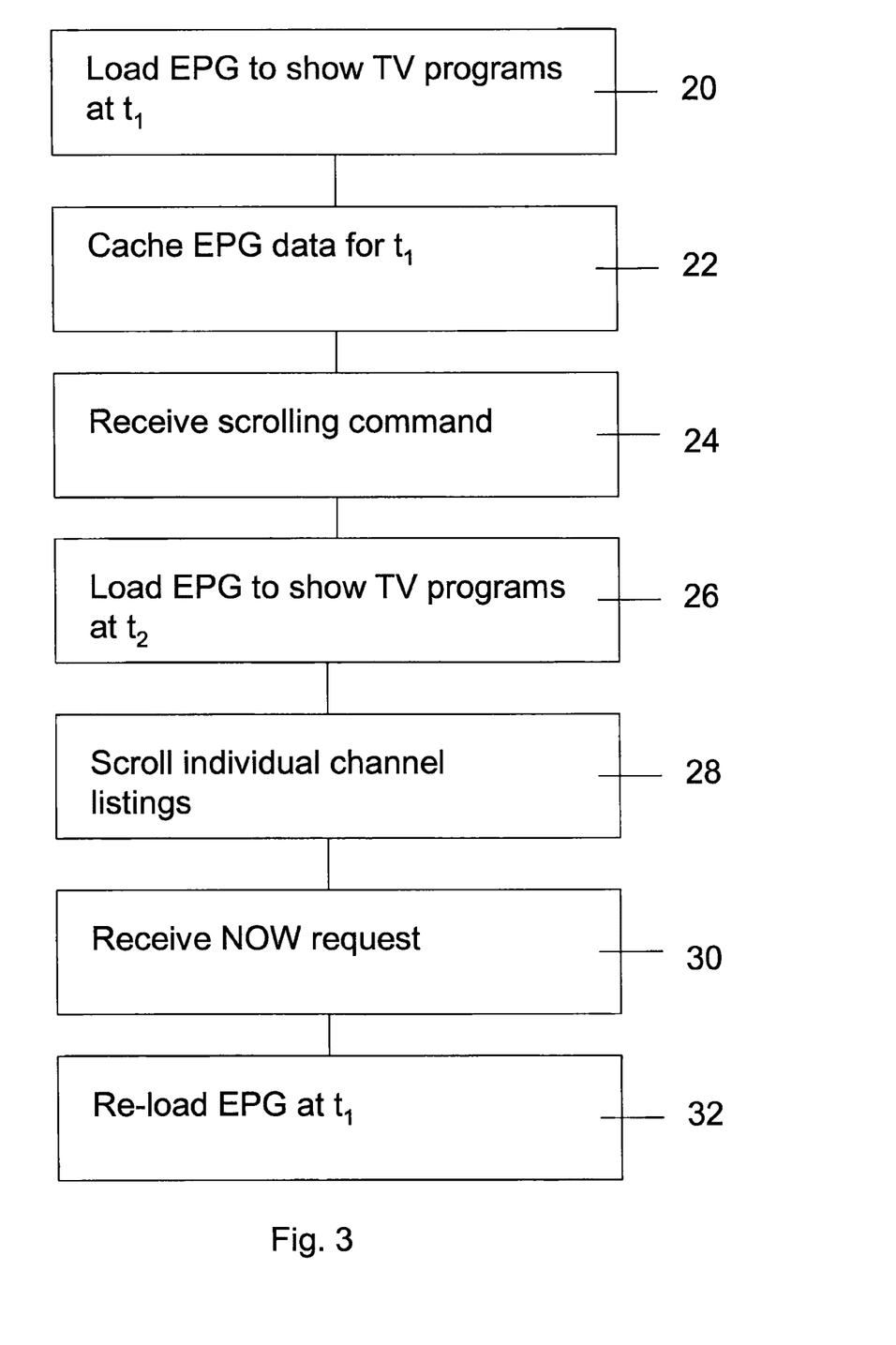
FIG. 3 is a flow diagram showing a sequence of steps that can be performed in a an embodiment of the present invention.
Figures 4A, 4B:
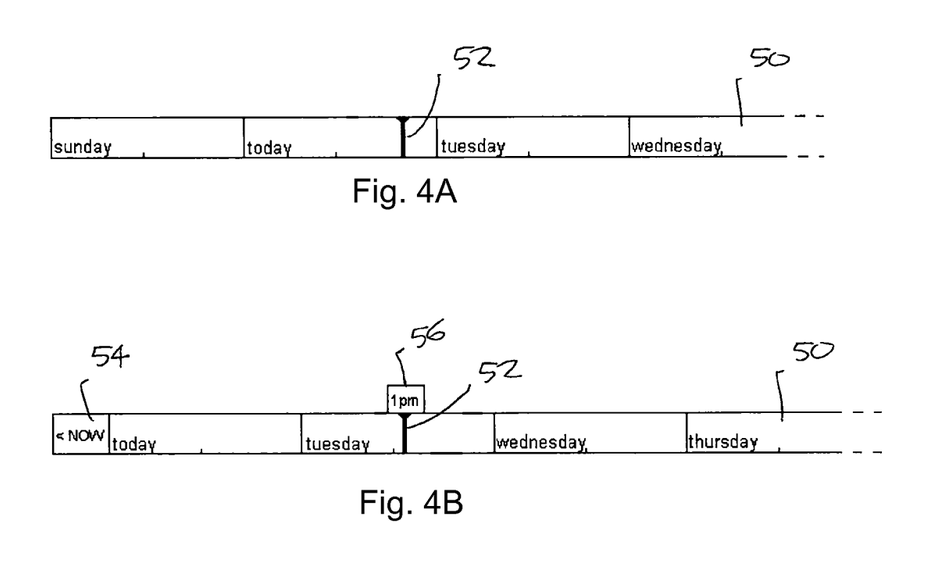
FIG. 4A is a schematic view of a timeline and an indicator in an embodiment of the present invention.
FIG. 4B is another view of a timeline and an indicator in an embodiment of the present invention.
Figure 5:
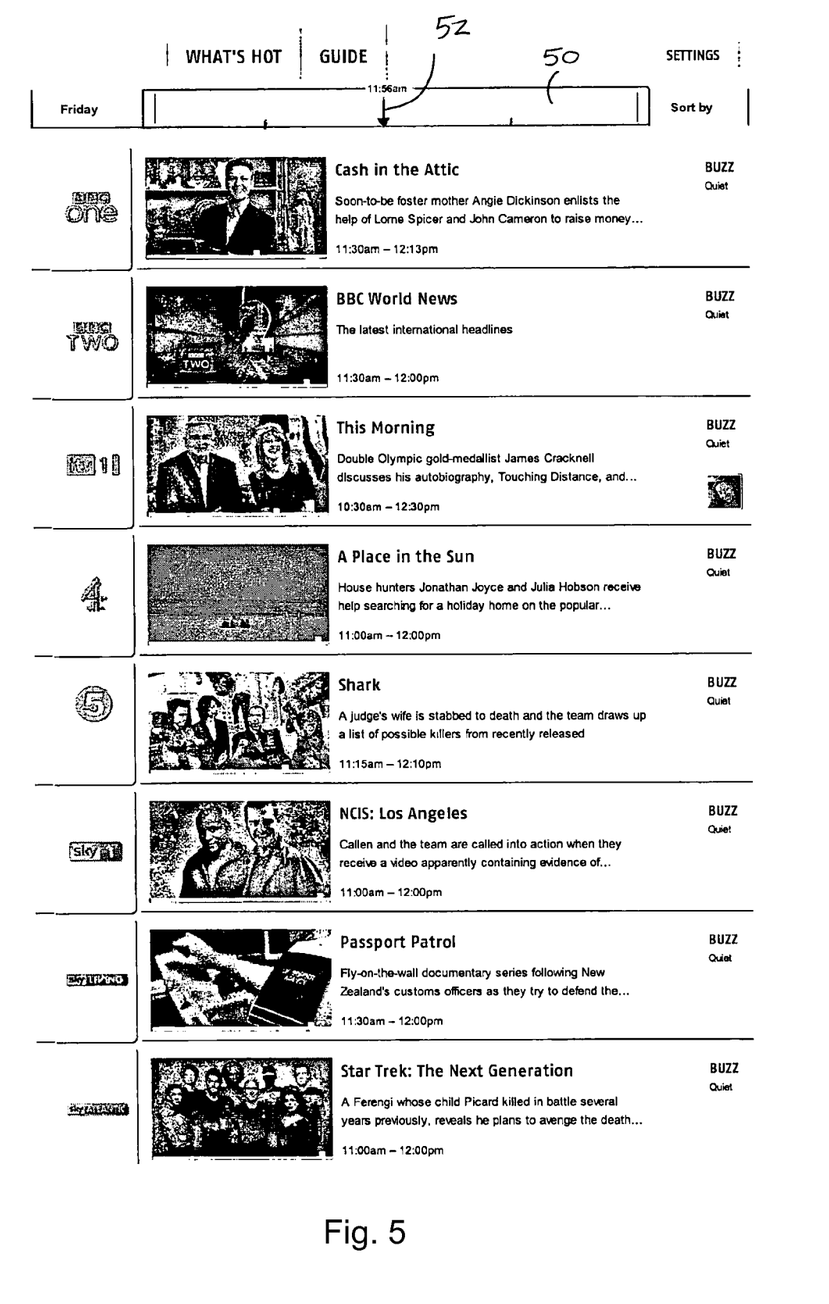
FIG. 5 is a screenshot showing an EPG in an embodiment of the invention.

The operation of the invention will now be described with reference to the flow diagram shown in FIG. 3, the timelines shown in FIGS. 4A and 4B and the screenshot shown in FIG. 5. FIG. 3 shows a sequence of steps that may be undertaken in an embodiment of the present invention. At step 20 the CPU 12 is configured to display an EPG on the touch screen display 10 showing television programs scheduled for time $t_1$, which is the current time. The EPG includes a list of television programs scheduled at time $t_1$ for each of a number of channels. For each channel in the EPG there is an image related to the television program, a channel identifier, a title, a brief description, a start time and an end time. Each television program in the EPG has a substantially fixed size, independent of program duration. An example of such an EPG is shown in FIG. 5.

The network interface 16 is configured to acquire the EPG data for time $t_1$ from the server 4 over the network 6. This may be achieved over a wired or wireless connection. The acquired data also includes the television programs that precede and succeed the currently scheduled programs, although these data are not initially displayed. At step 22 the EPG data for time $t_1$ are stored in the data storage unit 14 of the client device 2.

The displayed EPG also includes a timeline 50 and an indicator 52 that are displayed above the list of television programs. FIGS. 4A and 4B are examples of EPG timelines 50 and indicators 52 in an embodiment of the invention. In FIG. 4A the indicator 52 is shown at a position in the timeline that corresponds to the current time (a Monday evening). When this time is selected the displayed EPG would include a list of television programs at the relevant time. At step 24 the user can adjust the time for which television programs are displayed. Specifically, the user can select the timeline 50, using the touch screen display 10, and drag the timeline 50 to the left or the right so that it moves relative to the indicator 52. While the timeline 50 is moving relative to the indicator 52 a timestamp 56 is displayed so that the user can see the effect of their manipulations.

Once the user has completed their scrolling operation the network interface 16 can acquire the relevant EPG data from the server 4 over the network 6 so that the scheduled television programs can be displayed. The timestamp 56 is displayed adjacent the indicator 52 to show the relevant time for which scheduled programs are displayed in the EPG. The timestamp 56 is smaller in size when the timeline 50 is stationary than during the scrolling phase. A "Now" button 54 is also displayed, adjacent an end of the timeline 50.

In the presently described embodiment the user is able to complete the scrolling operation by selecting the timeline 50 and dragging it left or right on the touch screen display 10. When using a touch screen it is desirable that the user selects the timeline 50 rather than the indicator 52 so that the timestamp 56 is not obscured by a user's finger during a scrolling operation. In alternative embodiments it may be desirable to allow the user to select the indicator 52 and drag it left or right relative to the timeline 50; this alternative may be desirable when the EPG is displayed on a personal computer and the indicator is selected and moved with a pointer controlled by a mouse.

At step 26 the CPU 12 and the network interface 16 are configured to acquire EPG data for time $t_2$, corresponding to the new position of the indicator 52 on the timeline. In the example shown in FIG. 4B this means that the network interface 16 would acquire EPG data for 1 pm on the relevant Tuesday. These EPG data are downloaded from the server 4 and displayed on the touch screen display 10 below the timeline 50.

At step 28 in this example the user is able to scroll through the listings for an individual channel. In one arrangement this can be done without changing the position of the indicator 52 on the timeline 50. The downloaded EPG data includes current channel listings, which are initially displayed, as well as the preceding and subsequent television programs. Thus, a user can scroll individual channel listings without acquiring any further data from the server 4.

In an alternative arrangement at step 28 the user can scroll through the listings for an individual channel and the position of the indicator 52 can be dynamically updated on the timeline 50. In this arrangement the EPG can be manipulated so that an individual channel shows a television program scheduled at a new time, $t_3$. The CPU 12 can then acquire and display full EPG data for time $t_3$. In this way television programs on other channels can slot into place for the time $t_3$. This technique may provide a more fine-grain method for adjusting the position of the indicator 52, rather than manipulating its position directly. Typically a direct adjustment in the position of the indicator 52 may result in a change of EPG time of a number of hours, whereas a change by manipulating an individual channel may result in a change of EPG time of a number of minutes, depending on its program schedule. This technique for adjusting the EPG time in step 28 may be provided in addition to steps 24 and 26 or as an alternative.

At step 30 the user selects the "Now" icon 54 on the touch screen 10. Upon selection of this icon the timeline 50 and the indicator 52 slide relative to one another until the indicator 52 is once more positioned at the current time, $t_1$ Continuing the present example, the timeline 50 would transition from the state shown in FIG. 4B to that of FIG. 4A.

At step 32 the CPU 12 is configured to re-load the EPG data including television programs scheduled for time $t_1$. These data are acquired from the data storage unit 14 in the client device 2. By retrieving these data from the local cache the EPG is loaded more quickly than if the data were retrieved over the network 6.

What is claimed is:
1. A computer system comprising:
a display configured to display an electronic program guide (EPG) to a user, wherein the EPG includes a list of television channels having programs scheduled at a first time, a timeline, and an indicator for indicating the first time on the timeline;
an input module configured to receive a first input and a second input, wherein the first input involves selecting one of the indicator and the timeline on the display and adjusting their positions by moving one relative to the other, and the second input involves scrolling a single channel in the EPG so that the list includes a television program which is scheduled at a third time; and
one or more processors configured to adjust an appearance of the EPG in response to the first input so that the timeline and the indicator move relative to one another until the indicator is at a new position relative to the timeline, the new position corresponding to a second time, wherein the one or more processors are configured to update the displayed EPG so that it comprises a list of television channels having programs scheduled at the second time;
the one or more processors also configured to adjust the appearance of the EPG in response to the second input so that the indicator is at a new position relative to the timeline, the new position corresponding to the third time, wherein the one or more processors are configured to update the displayed EPG so that it comprises a list of television channels having programs scheduled at the third time.

2. The computer system of claim 1 wherein the input module is configured to receive a user input directing the indicator to revert from the second time to the first time on the timeline, and wherein the one or more processors are configured to update the displayed EPG, responsive to the user input, so that it comprises the list of television programs scheduled at the first time.

3. The computer system of claim 1 wherein the first time corresponds to a current time and the second time corresponds to a desired past or future time.

4. The computer system of claim 1 wherein the EPG comprises a visible timestamp when the indicator is at the position corresponding to the second time on the timeline.

5. The computer system of claim 1 wherein the EPG comprises a visible timestamp when the indicator is moving relative to the timeline, the visible timestamp providing for precise control of the position of the indicator.

6. The computer system of claim 1 wherein the EPG comprises the list of television programs scheduled at the first time, and a list of subsequently scheduled television programs.

7. The computer system of claim 1 wherein the displayed EPG includes one or more of a name of the television program, a start time, an end time, and an identifier for at least one of the user's contacts.

8. The computer system of claim 1 wherein the first input involves selecting the timeline on the display and moving it relative to the indicator, which remains stationary on the display.

9. The computer system of claim 1 wherein the display is a touch screen display and the input module is configured to receive user generated inputs via the touch screen display.

10. The computer system of claim 2 wherein the display is configured to display a selectable item with which to direct the indicator to revert to the first time on the timeline.

11. The computer system of claim 2 wherein the display, the input module and the one or more processors are components in a client device, and the one or more processors are configured to acquire the list of television programs scheduled at the second time from an external source.

12. The computer system of claim 5 wherein the visible timestamp is larger when the indicator is moving relative to the timestamp than when the indicator is stationary.

13. The computer system of claim 6 wherein the displayed EPG includes a list with only a single television program for each channel, and the input module is configured to receive a user generated input to toggle between the television program scheduled at the first time and the subsequently scheduled television program.

14. The computer system of claim 11 wherein the client device comprises a data storage unit to store the list of television programs scheduled at the first time, and the one or more processors are configured to retrieve the list of television programs scheduled at the first time from the data storage unit when updating the displayed EPG so that it is relevant to the first time.

15. A method of interacting with an electronic program guide (EPG) in a computer system comprising the steps of:
    displaying the EPG on a display, wherein the EPG comprises a list of television programs scheduled at a first time, a timeline, and an indicator for indicating the first time on the timeline;
    selecting one of the indicator and the timeline on the display and adjusting their positions by moving one relative to the other;
    adjusting the appearance of the EPG so that the timeline and the indicator move relative to one another until the indicator is at a new position relative to the timeline, the new position corresponding to a second time;
    updating the displayed EPG so that it comprises a list of television programs scheduled at the second time;
    scrolling a single channel in the EPG so that the list includes a television program which is scheduled at a third time;
    adjusting the appearance of the EPG so that the indicator is at a new position relative to the timeline, the new position corresponding to the third time; and
    updating the displayed EPG so that it comprises a list of television programs scheduled at the third time.

16. A non-transitory computer readable storage medium having a computer program stored thereon, the computer program comprising processor readable instructions that, when executed, direct a device to perform actions comprising:
    displaying an electronic program guide (EPG) on a display, wherein the EPG comprises a list of television programs scheduled at a first time, a timeline, and an indicator for indicating the first time on the timeline;
    receiving a user generated input, wherein the input involves selecting one of the indicator and the timeline on the display and adjusting their positions by moving one relative to the other;
    adjusting the appearance of the EPG so that the timeline and the indicator move relative to one another until the indicator is at a new position relative to the timeline, the new position corresponding to a second time;
    updating the displayed EPG so that it comprises a list of television programs scheduled at the second time;
    scrolling a single channel in the EPG so that the list includes a television program which is scheduled at a third time;
    adjusting the appearance of the EPG so that the indicator is at a new position relative to the timeline, the new position corresponding to the third time; and
    updating the displayed EPG so that it comprises a list of television programs scheduled at the third time.

* * * * *